United States Patent
Gagnon

[15] 3,634,921
[45] Jan. 18, 1972

[54] HOSE NIPPLE EXTRACTOR

[72] Inventor: Rosaire P. Gagnon, P.O. Box 515, Upper Frenchville, Maine 04784

[22] Filed: Aug. 14, 1969

[21] Appl. No.: 850,024

[52] U.S. Cl.................................................29/237, 29/264
[51] Int. Cl........................................................B23p 19/04
[58] Field of Search...................29/234, 235, 263, 264, 247, 29/280, 281, 272; 254/29 A; 279/7

[56] References Cited

UNITED STATES PATENTS

| | | | |
|---|---|---|---|
| 515,826 | 3/1894 | Gibney | 279/7 |
| 1,818,626 | 8/1931 | Johnston | 29/264 X |
| 2,702,715 | 2/1955 | Andrews | 279/7 UX |
| 3,490,132 | 1/1970 | Kosters et al. | 29/264 X |

Primary Examiner—Andrew R. Juhasz
Assistant Examiner—Gilden: Leon

[57] ABSTRACT

This invention consists of a short piece of metal tubing in which is located a threaded rod that projects out one end of the metal tube through a washer to terminate in the hub of a handle that is at right-angle to the aforesaid rod. That end of the threaded rod that is in the metal tube is provided with a chuck adapted to securement to any nipple that one wishes to remove from a piece of ruptured hose having the nipple on one end thereof. A T-shaped handle, having a threaded stem, is screwed down through a hub that is suitably secured to the outside of the aforesaid metal tubing. The lower end of the aforesaid threaded stem is screwed down onto any piece of ruptured hose that is placed in the open end of this invention. The aforesaid stem firmly holds the hose while the threaded rod and its chuck pulls out the nipple from the end of the hose, as will be thoroughly understood by those experienced in the art when one examines FIG. 2 of the accompanying drawing.

3 Claims, 2 Drawing Figures

PATENTED JAN 18 1972

3,634,921

INVENTOR
ROSAIRE P GAGNON

HOSE NIPPLE EXTRACTOR

This invention relates to both hose nipples and extractors; more particularly, to an extractor especially designed to extract a nipple from the end of a piece of hose, as will hereinafter be explained.

Whenever a hose containing water, oil or steam under pressure ruptures, it is desirable to extract the nipple nearest the ruptured end, cut out the ruptured section of the hose, and again use the nipple in a new hose. This can frequently be a time consuming job whose results are not entirely satisfactory to those experienced in the art of handling a pressure hose.

It is therefore the principal object of this invention to provide a hose nipple extractor of the character described that will permit even the most inexperienced person in the art to extract a nipple from the end of a piece of hose in a minimum of time and with a minimum of effort.

Another object of this invention is to provide a hose nipple extractor containing a minimum number of parts, none of which are spring-loaded, that will last indefinitely regardless of how it is handled.

Still another object of this invention is to provide a hose nipple extractor of the character described that is small enough to fit into the tool kit of any maintenance man for use on the job regardless of the job's location.

Further objects and advantages of this invention will become apparent from the reading of the following specification and its appended claims and from an examination of the accompanying drawing wherein:

In the two views of this invention, like parts are indicated by like reference numbers. The reference number 5 indicates this invention in its entirety.

Figure 1:
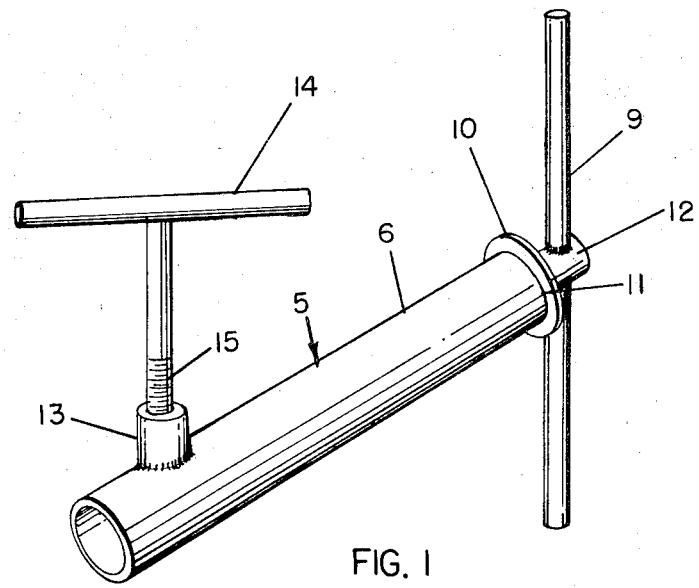
FIG. 1 is a pictorial view of this invention.
Figure 2:
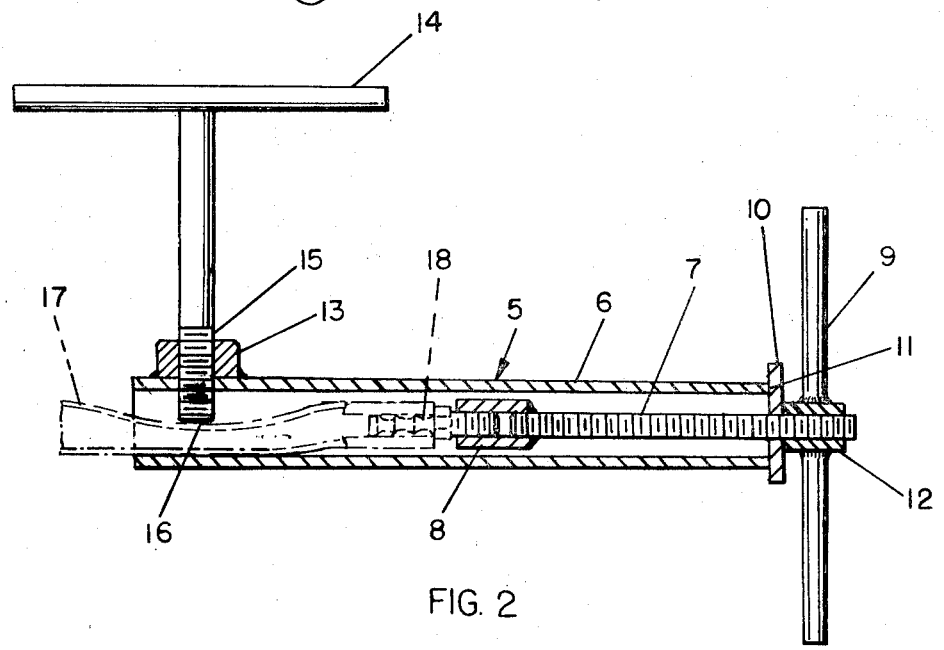
FIG. 2 is a longitudinally disposed sectional view of this invention having a piece of hose projecting therein from which a nipple is to be extracted, both the hose and nipple are shown in phantom lines since they are not a part of this invention.

Looking first at FIG. 2 of the accompanying drawing it will be seen that this invention 5 consists of a piece of metal tube 6. A threaded rod 7 has its inner end adapted to a chuck 8 and its external end secured to a handle 9. The handle 9 is at right-angle to the aforesaid threaded rod 7. A washer 10 is located on the threaded rod 7 between the end 11 of the aforesaid metal tube 6 and the inside end of the internally threaded hub 12 of the aforesaid handle 9 that is at right-angle to the oftenmentioned threaded rod 7.

A second hub 13 is welded or otherwise firmly secured to the outside of the aforesaid metal tube 6. A T-shaped handle 14, having an externally threaded stem 15, is screwed down through the aforesaid second hub 13 in order that the lower end 16 of the just mentioned stem 15 can be screwed down on a piece of ruptured hose 17 from which it is desired to extract the nipple 18, as one can clearly see by examination of the aforesaid FIG. 2 of the accompanying drawing.

The way in which this invention is used is quite simple and is actually self-explanatory to those experienced in the art once they have examined the already mentioned FIG. 2 of the drawing.

The hose clamp is first removed from the nipple to be extracted, then the piece of ruptured hose 17 from which it is desired to extract the nipple 18 is placed in the tube portion of this invention far enough to permit the lower end 16 of the threaded stem of the T-shaped handle to be screwed down on top of the piece of ruptured hose. The aforesaid chuck 8 is now screwed onto the aforesaid nipple 18 by rotating the handle 9 which must have the inside end of the aforesaid hub 12 up against the washer 11, as is clearly shown in the accompanying drawing. Now, either hold the metal tube 6 tightly in the hand or secure it firmly in a vise and then rotate the aforesaid handle 9 in the direction that is the reverse of that used when the chuck 8 was screwed onto the nipple 18. This screwing of the handle 9 will now cause the chuck 8 to pull the nipple from the ruptured piece of hose 17 which is now removed from the metal tube 6 after the aforesaid T-shaped handle 9 is unscrewed.

This invention is subject to any and all changes in detail design and/or construction and/or modification that one may care to make in the same in so long as the changes and/or modifications fall within the scope and intent of the appended claims.

What I now claim as new and desire to secure by Letters Patent is:

1. A hose nipple extractor of the character described, comprising a metal tube in one end of which may be placed an end of a piece of ruptured hose having a nipple in said end thereof; manually operated mechanism for holding an end of a piece of ruptured hose in said tube, the manually operated mechanism consisting of a T-shaped handle having a threaded stem that screws down through a hub that is secured to the outside of the said metal tube, the lower end of said threaded stem being adapted to be screwed down on top of a piece of ruptured hose after the hose is placed in said metal tube; a second mechanism which embodies a chuck on that end of a threaded rod that extends into the other end of said metal tube, the said chuck being adapted to securement to a nipple that is to be extracted from a piece of ruptured hose while the outer end of said threaded rod passes through an internally threaded hub which hub is secured to the other end of said tube, and a handle secured to the outer end of said threaded rod and extending at right-angle thereto.

2. The invention of claim 1, wherein the said chuck is provided with internal threads in one end thereof that permits the chuck to be screwed onto a nipple that is to be extracted from a piece of ruptured hose.

3. The invention of claim 2, wherein a washer of a diameter greater than that of the said metal tube is located on the said threaded rod between that end of the said metal tube from which the said threaded rod extends and the inside end of the said hub.

* * * * *